(12) United States Patent
Imamura

(10) Patent No.: US 6,359,752 B1
(45) Date of Patent: Mar. 19, 2002

(54) MAGNETIC HEAD SLIDER AND METHOD FOR FORMING LEAD WIRES USED THEREIN

(75) Inventor: Takahiro Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/264,185

(22) Filed: Mar. 8, 1999

(30) Foreign Application Priority Data

Mar. 12, 1998 (JP) .......................................... 10-061415

(51) Int. Cl.[7] .......................... G11B 17/32; G11B 5/60; G11B 15/64
(52) U.S. Cl. .................................. 360/234.7; 360/234.5
(58) Field of Search .......................... 360/234.5, 234.3, 360/235, 290, 294, 294.1, 294.2, 294.3, 294.4, 294.7

(56) References Cited

U.S. PATENT DOCUMENTS

| | | | |
|---|---|---|---|
| 5,400,192 A | * 3/1995 | Mizoshita et al. | 360/77.16 |
| 5,856,896 A | * 1/1999 | Berg et al. | 360/104 |
| 5,898,541 A | * 4/1999 | Boutaghou et al. | 360/109 |
| 5,920,978 A | * 7/1999 | Koshikawa et al. | 29/603.12 |
| 5,998,906 A | * 12/1999 | Jerman et al. | 310/309 |
| 6,067,215 A | * 5/2000 | Zhang | 360/260 |
| 6,078,473 A | * 6/2000 | Crane et al. | 360/104 |

FOREIGN PATENT DOCUMENTS

| | | | |
|---|---|---|---|
| JP | 8-180623 | * | 7/1996 |
| JP | 9-22519 | * | 1/1997 |
| JP | 981924 | | 3/1997 |

\* cited by examiner

Primary Examiner—William Klimowicz
(74) Attorney, Agent, or Firm—Greer, Burns & Crain, Ltd.

(57) ABSTRACT

In a magnetic head slider having a horizontal type head element which floats on or comes into contact with a recording medium, in which a portion 32 of the slider including the head element can be moved in a minute range in the tracking direction and the loading and unloading direction and is supported by a stationary section 31 forming a slider body via a support spring 34, a leading wire 22 drawn out from the head element 43 is formed in the process of manufacturing the slider so that the motions of the movable section 32 of a microactuator with respect to the stationary section 31 are not obstructed. The lead wire 22 drawn out from the head element 43 mounted on the movable section 32 is composed of a flexible lead wire 22, the rigidity of which is lower than that of the support spring 34, and a leading wire (which is a flexible lead wire 22) is drawn from the movable section to the stationary section so that the movement of the movable section with respect to the stationary section is not restricted.

10 Claims, 8 Drawing Sheets

MAGNETIC HEAD SLIDER AND METHOD FOR FORMING LEAD WIRES USED THEREIN

BACKGROUND OF THE INVENTION

1. Field of the Invention

The present invention relates to a magnetic head slider used for a magnetic disc unit. Also, the present invention relates to a method of forming lead wires inside the magnetic head slider, especially in a portion containing a microactuator.

In recent years, magnetic disc units have been made compact, their performance has been highly enhanced, and their cost has been reduced. In accordance with the recent tendency, it is desired to develop a thin film magnetic head of high performance and low cost. In order to meet the demand, a horizontal magnetic head (planar magnetic head) has been proposed in which a thin pattern forming surface is arranged in parallel with a flying surface. The reason is described as follows. In the case of a horizontal magnetic head, it is easy to form flying rails having specific shapes. Therefore, it is possible to realize a magnetic head capable of flying stably close to the disc surface, and further it is easy to reduce a portion to be machined in the manufacturing process. Therefore, the cost can be lowered.

In accordance with an increasing demand for enhancing the density of magnetic recording and also in accordance with an increasing demand for reducing the sizes of the head element and the magnetic head slider, problems occur in machining and handling.

2. Description of the Related Art

For the above reasons, the present inventors proposed a magnetic head slider which can be manufactured almost without being machined so that the manufacturing cost can be reduced. This magnetic head slider is disclosed in Japanese Unexamined Patent Publication No. 9-81924, the title of which is "Thin film magnetic head slider and electrostatic actuator". A microactuator is incorporated into this magnetic head slider. Therefore, it is possible to accurately control the head element in the tracking direction and the loading and unloading direction.

The above prior art will be explained below.

FIGS. 1 and 2 are views showing a thin film magnetic head slider of the prior art. FIG. 1 is a perspective view of the slider 10 attached to the head suspension 30, seen from the flying surface side. FIG. 2 is a perspective view of the slider 10, seen from the back (opposite side to the flying surface) thereof, before the slider 10 is attached to the head suspension 30.

A portion of the flying surface layer 11 made of $SiO_2$ or $Al_2O_3$ protrudes onto the flying surface side of the slider 10 which is opposed to a recording medium not shown in the drawing. This protruding portion forms two flying rails 15 which extend from the leading end 13 to the trailing end 14 with respect to the recording medium moving in the direction of arrow A. On the leading end 13 side between the two flying rails 15, there is provided a central rail 17. Metallic plating of Ni is conducted on the main body 12 of the slider 10 formed on the back of the flying surface layer 11, and also metallic plating of Ni is conducted on the terminal pad section 18 shown in FIG. 2.

The electrostatic microactuator 20 (tracking mechanism) is formed in a portion of the flying surface 11 between the two flying rails 15 and also between the terminal pad 18 and the outflow end 14.

Although the details are not shown in the drawings, the electrostatic microactuator 20, which utilizes an electrostatic attraction force in its operation, is composed of a movable section and a stationary section. On a side of the movable section which is opposed to the recording medium, there is provided an element mount section. There are provided metallic electrodes between the movable and the stationary section in portions respectively opposed to each other. When voltage is impressed between the electrode on the stationary section side and the electrode on the movable section side, an attractive force is generated, and the head element is moved by the attractive force in a direction perpendicular to the track, and tracking is conducted.

SUMMARY OF THE INVENTION

An object of the present invention is to provide a magnetic head slider, in which lead wires can be drawn from the head element, which is mounted on the movable station, to the stationary section (slider body) without interfering with movement of the microactuator, such as disclosed in the above Japanese Unexamined Patent Publication No. 9-81924.

According to the present invention, there is provided a magnetic head slider adapted to be opposed to a recording medium comprising: a medium opposing surface being in contact with or flying above a recording medium; a horizontal type head element having a head film which is parallel to said medium opposing surface; a movable section constituted by a part of said head slider including said head element, said movable section supported on a stationary section including a slider body by means of a support spring so as to be movable within a small limited range at least in a tracking direction or in a load-unload direction with respect to said recording medium; and a lead line extending from said head element mounted on said movable section and made of a flexible lead wire, said flexible lead wire extending from said movable section to said stationary section so as not to obstruct the movement of said movable section with respect to said stationary section.

As described above, the lead wires drawn out from the head element are composed of flexible lead wires, the rigidity of which is lower an that of the support spring. Therefore, movement of the movable section with respect to the stationary section is not obstructed by the lead wires. Further, the lead wires can be foamed simultaneously during the manufacturing process of the magnetic head slider.

The flexible lead wire comprises, in cross-section thereof, a conductor portion and a flexible insulator covering said conductor portion. Particularly, the flexible lead wire comprises three laminated layers including two, upper and lower, flexible insulating layers and a central conductor layer sandwiched between said two flexible insulating layers.

Due to the foregoing, the lead wires, the flexibility of which is sufficiently high, can be formed by means of patterning in the manufacturing process of the magnetic head slider.

The flexible lead wire comprising upper and lower flexible insulating layers and a conductor layer sandwiched between said two flexible insulating layers is substantially in parallel to said medium opposing surface. Also, the flexible lead wire has such a shape that it can be deformed within the same single surface or out of a single surface. In addition, the flexible lead wire is bent at least twice to form a U-shaped portion in the small space between the movable section and the stationary section.

The two, upper and lower, flexible insulating layers comprise a cured photoresist. The horizontal type head element comprises an information recording head element and a reproducing head element.

Due to the foregoing, the rigidity of the flexible lead wires can be further reduced.

According to another aspect of the present invention, there is provided a process for manufacturing a magnetic head slider, the process comprising: forming a sacrifice layer on a substrate; forming, on the sacrifice layer, a flying surface layer and a movable section including a head element layer and, in addition, forming a slider body defining a stationary section; and removing the sacrifice layer to separate the head slider from the substrate; characterized in that, after the flying surface layer and the movable section including the heat element layer are formed and before the slider body is formed, a lead line, which should be extended from the head element mounted on the movable section to the stationary section of the slider body, is formed by patterning.

Due to the foregoing, the formation of the lead wires can be conducted in the wafer patterning process when the slider is manufactured.

The lead line is formed in such a manner that: a first flexible insulating layer is patterned and hard baked; a conductor layer film is patterned on the first flexible insulating layer; and a second flexible insulating layer is patterned and hard baked on the conductor layer, so that said lead line comprises three layers including two, first and second, flexible insulating layers and a central conductor layer sandwiched between the two flexible insulating layers.

Due to the foregoing, it is possible to form flexible lead wires, the flexibility of which is high and the rigidity of which is low.

BRIEF DESCRIPTION OF THE DRAWINGS

FIGS. 7 to 16 are views showing a manufacturing process of the magnetic head slider of the present invention; wherein FIG. 7 shows a formation process of the sacrifice layer; FIG. 8 shows a formation of the flying surface layer; FIG. 9 shows a process in which the flying layer is made to be thick; FIG. 10 shows a formation process of the conductor layer (Au); FIG. 11 shows a process in which an additional sacrifice layer is formed; FIG. 12 shows the formation of the flexible lead wire; FIG. 13 is an enlarged view showing a primary portion of FIG. 12; FIG. 14 shows a formation of a plating base in the next process; FIG. 15 shows a state in which a magnetic head slider is formed on a sacrifice layer; and FIG. 16 shows a state in which a sacrifice layer is removed by etching and a magnetic head slider is completed;

DETAILED DESCRIPTION OF THE PREFERRED EMBODIMENTS

Figure 1:
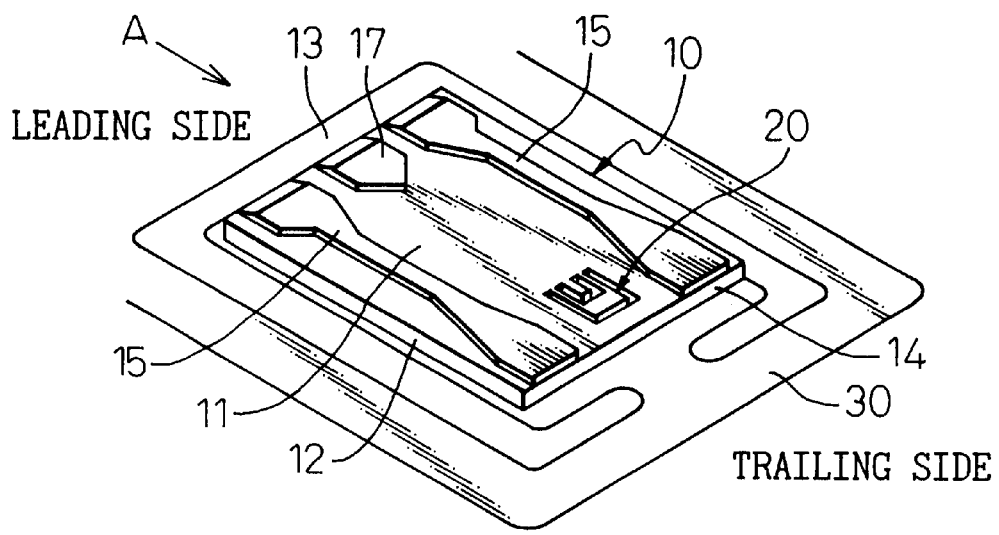
FIG. 1 is a perspective view of the conventional magnetic head slider, seen from the flying surface side.
Figure 2:
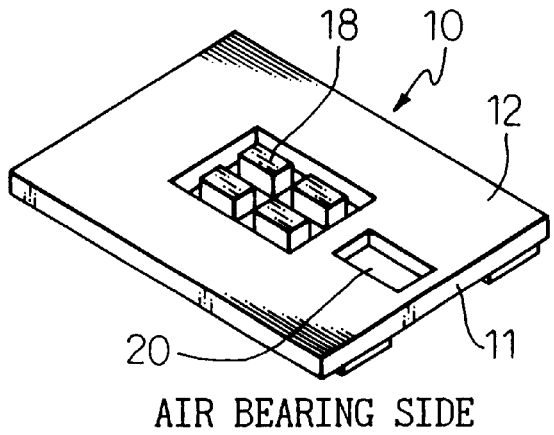
FIG. 2 is a perspective view of the conventional magnetic head slider, seen from the back.
Figure 3:
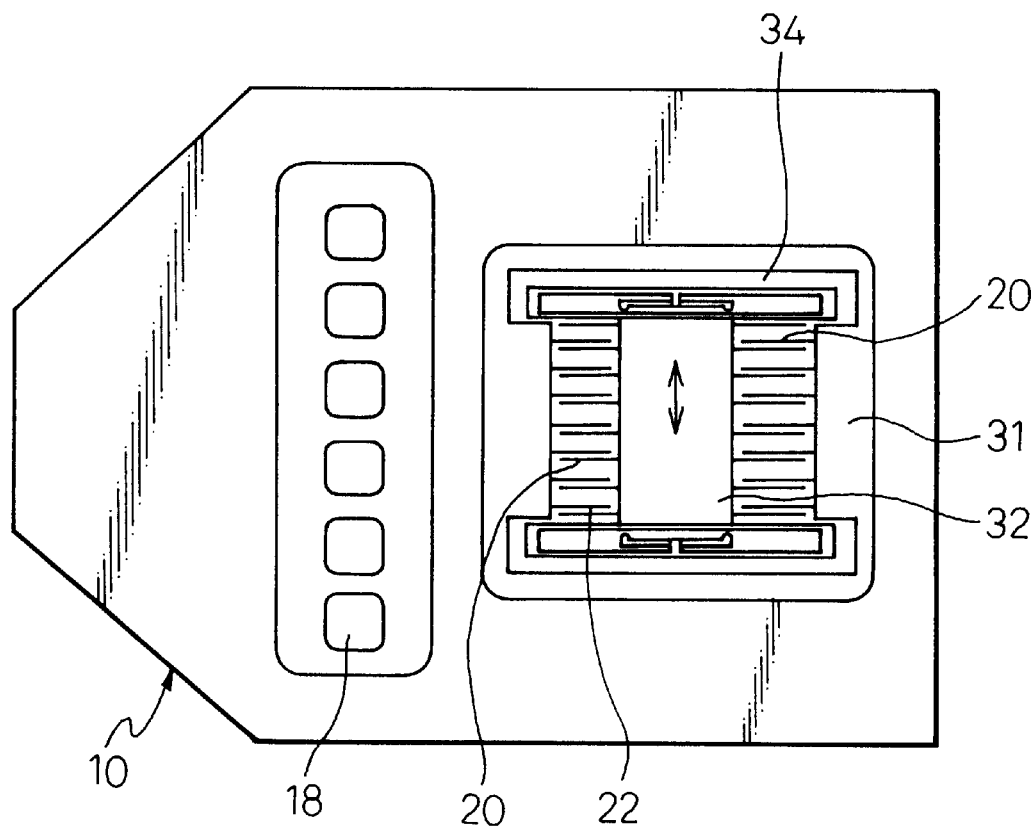
FIG. 3 is a plan view of the magnetic head slider of the present invention.
Figure 4:
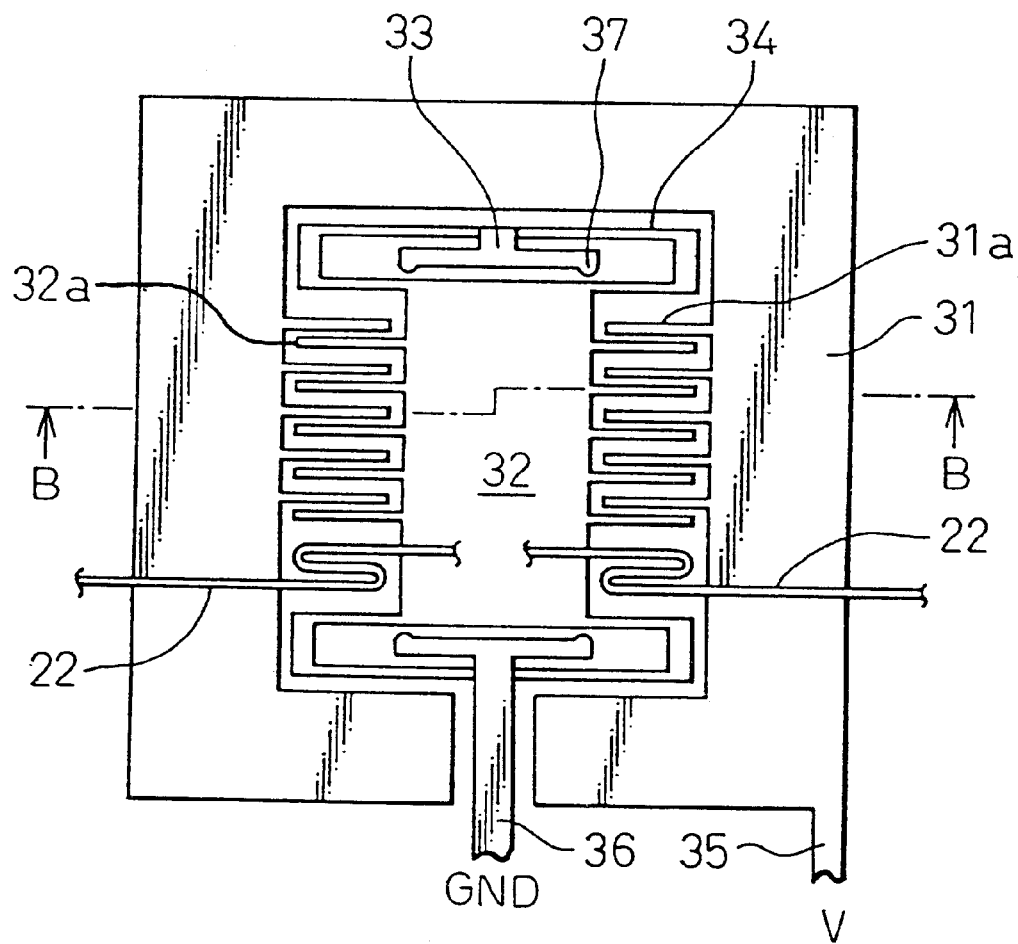
FIG. 4 is a plan view of the electrostatic actuator of the magnetic head slider of the present invention.
Figure 5:
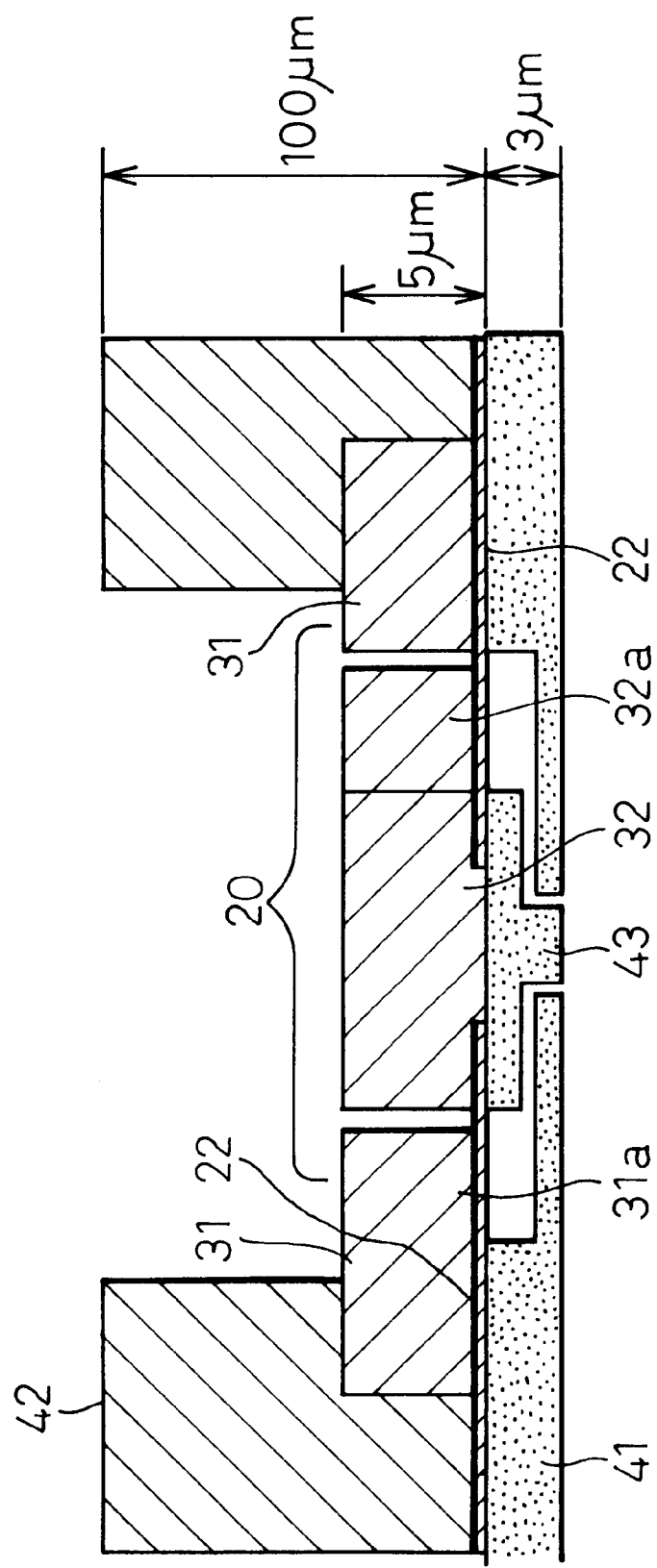
FIG. 5 is a cross-sectional view of the electrostatic actuator of the magnetic head slider of the present invention.

FIG. 3 is a plan view showing an outline of the magnetic head slider of the present invention. FIG. 4 is a plan view of the microactuator of the magnetic head slider. FIG. 5 is an enlarged cross-sectional view taken on line B—B in FIG. 4, wherein a lead wire portion drawn out from the head element is also shown in FIG. 5.

As shown in FIG. 5, the entire magnetic head slider 10 is composed in such a manner that a plated layer of Ni, which is a slider body layer 42, is provided on a layer of $SiO_2$ which is a flying layer 41.

As shown in FIG. 4, the electrostatic microactuator 20 is fixed onto a substrate, not shown, when the stationary section 31, the outer frame of which is formed by plating of Ni, is fixed to the substrate. On the inner wall of the stationary section 31, there are provided teeth 31a, which are arranged toward the inner circumference in parallel to each other at regular intervals, wherein these teeth 31a are formed by means of plating of Ni simultaneously with the formation of the stationary section 31. These teeth 31a may be fixed onto the substrate or arranged such that a gap (not shown in the drawings) is left between the teeth and the substrate.

A central portion located inside the frame of the stationary section 31 is the movable section 32 which is formed by means of plating of Ni simultaneously with the formation of the stationary section 31. The movable section 32 is arranged so that it can be relatively moved with respect to the stationary section 31 when a gap (not shown) is left between the movable section 32 and the substrate. In the movable section 32, there are provided a plurality of teeth 32a at positions shifted from the centers of the teeth 31a, which are arranged in parallel to each other in the stationary section 31, and these teeth 32a are arranged in parallel to the teeth 31a.

In the drawing, at an upper portion and a lower portion of the movable section 32, there are provided supports 33 fixed to the substrate, and also there are provided support springs 34, by which the movable section 32 can be moved in the upward and downward direction in the drawing and also in the direction perpendicular to the surface of the drawing, between the supports 33 and the movable section 32. A head element (not shown) formed in the movable section 32 can be moved in the tracking direction, which is the upward and the downward direction in the drawing, and in the loading and unloading direction, which is a direction perpendicular to the drawing, by the action of the substantially C-shaped support springs 34 arranged at the four corners of the movable section 32.

In the drawing, lead wires 35, 36 to be connected to terminals, not shown in the drawings, are formed by means of plating of Ni at the right lower portion of the stationary section 31 and at the support on the lower side.

When voltage is impressed between the two lead wires 35, 36, an electrostatic attraction force generated between the teeth 31a of the stationary section 31 and the teeth 32a of the movable section 32. The movable section 32 is attracted upward by this electrostatic attraction force and is moved to a position at which the electrostatic attraction force is balanced with a restoring force of the support spring 34. In order to prevent the occurrence of a short circuit of the teeth 31a of the stationary section 31 with the teeth 32a of the movable section 32 when an excessively high voltage input is given, a stopper is arranged in a portion of the support 33 by reducing a gap between the support 33 and the movable section 32. A cross section of the support spring 34 is determined as follows. For example, the width is 5 $\mu$m, the heigth is 5 $\mu$m, and the length is 100 $\mu$m.

As shown in FIG. 3, there are provided bent lead wires 22 at the four corners of the movable section 32. Only two bent lead wires 22 are arranged on the lower side shown in FIG. 4. The shape of the flexible lead wire 22 is formed in such a manner that two U-shape are connected with each other in a space between the movable section 32 and the stationary section 31. Therefore, the rigidity in the upward and the downward direction in the drawings is low, and also the rigidity in the direction perpendicular to the surface of the drawing is low. The flexible lead wires 22 electrically connect the head element 43 (shown in FIG. 5), which is arranged on the movable section 32, with the terminals 18 (shown in FIG. 3), which are arranged on the slider body.

As shown in FIG. 5, the electrostatic microactuator 20 is composed of a plated layer of Ni which is thinner than the slider body 42 including the support spring 34 (not shown in FIG. 5).

Figure 6:
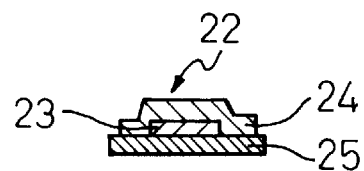
FIG. 6 is a cross-sectional view of a flexible lead wire.

FIG. 6 is a cross-sectional view of the flexible lead wire 22. As shown in the drawing, the flexible lead wire 22 is composed in such a manner that the conductor layer 23 is sandwiched between the upper flexible insulating layer 24 and the lower flexible insulating layer 25. The thickness of the flexible lead wire 22 is sufficiently thinner than that of the support spring 34 that supports the movable section 32 so that the motion of the movable section 32 cannot be affected by the rigidity of the flexible lead wire 22 itself. For example, the thickness of the flexible lead wire 22 is determined to be 0.1 $\mu$m. The width is not more than that of the support spring 34, for example, the width of which is 2 $\mu$m. Therefore, even the total rigidity of the four flexible lead wires 22 is sufficiently lower than the rigidity of support spring 34. Accordingly, motion of the movable section 32 is not obstructed by the flexible lead wires 33.

Since the flexible lead wire 22 is covered with the insulating layers 24, 25 from the upper and the lower sides, it is possible to arrange the flexible lead wire 22 to come into contact with the movable section 32 and the stationary section 31. In the case of an inductive head, the head element 43 mounted on the movable section 32 has two terminals. When MR head is used for reading, two terminals (not shown) are further added. These terminals are connected to the terminal section 18 via the flexible lead wire 22. Due to the above arrangement, it is possible to draw out the lead such as signal wires from the head element 43 arranged in the movable section 32.

Next, referring to FIGS. 7 to 16, a formation process of the magnetic head slider 10 of the present invention, especially, a formation process of its eletrostatic microactuator 29, will be explained below.

Figure 7:
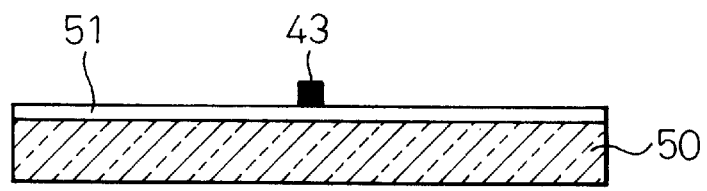

(1) A sacrifice layer (Al layer) 51 is formed on the overall surface of the glass substrate 50. This sacrifice layer is provided for separating the slider 10 from the substrate 50 by etching. Next, a head element 43 composed of a magnetic film is formed at a predetermined position on the sacrifice layer 51 as shown in FIG. 7.

Figure 8:
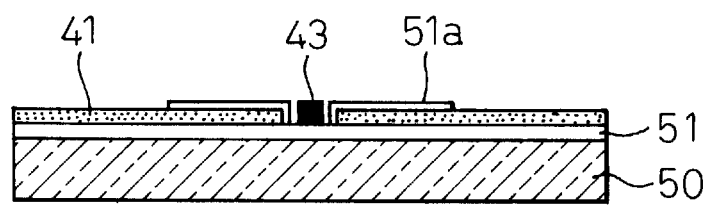

(2) A flying surface layer (SiO$_2$) 41 is formed in all regions on the sacrifice layer 51 except for the position at which the head element 43 is formed and also except for the periphery of the head element 43. Further, a second sacrifice layer (Al) 51a is formed in a region, in which the electrostatic microactuator 20 is formed, in the periphery of the head element 43 on the surface of the flying surface layer (SiO$_2$) as shown in FIG. 8.

Figure 9:
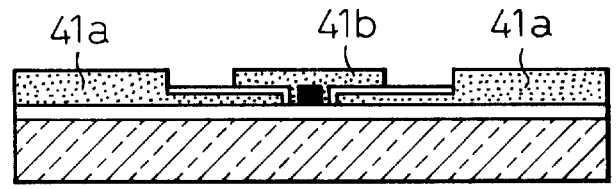

(3) Flying surface layers (SiO$_2$) 41a, 41b are respectively formed in a region including the head element 43 in which the movable section 32 of the electrostatic microactuator 20 is formed and also in a region in which the stationary section 31 of the electrostatic microactuator 20 is formed, and these flying surface layers 41a, 41b are made thick so that the same thickness can be provided as shown in FIG. 9.

Figure 10:
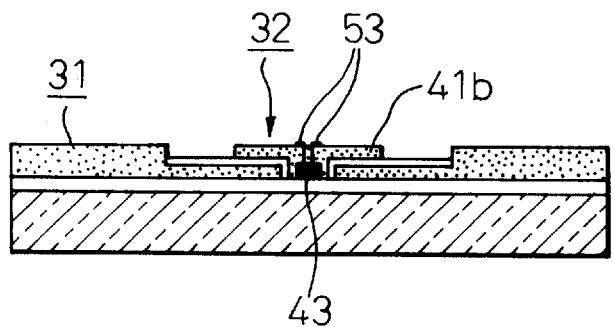

(4) A conductor layer 53 made of Au is formed on the flying surface layer (SiO$_2$) 41b on which the movable section 32 is formed, and one end of this conductor layer 53 is connected to the head element 43, and the other end is exposed onto an upper surface of the flying surface layer (SiO$_2$) 41b which is the movable section 32 as shown in FIG. 10.

Figure 11:
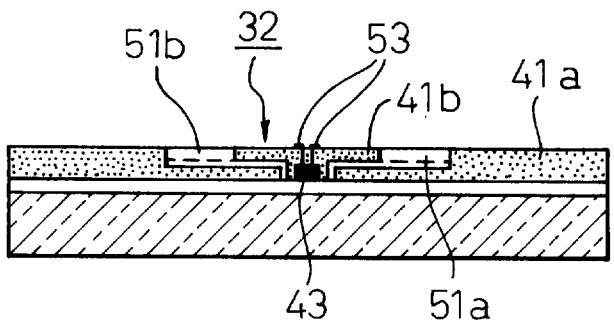

(5) Further, a third sacrifice layer (Al) 51b is formed on the second sacrifice layer (Al) 51a in a recessed portion between the flying surface layer (SiO$_2$) 41b, which forms the movable section 32, and the flying surface layer (SiO$_2$) 41a, which forms the stationary section 31. The thickness of this sacrifice layer 51b is increased so that the height of an upper surface of the sacrifice layer 51b can be the same as the height of the flying surface layers 41a, 41b as shown in FIG. 11.

Figure 12:
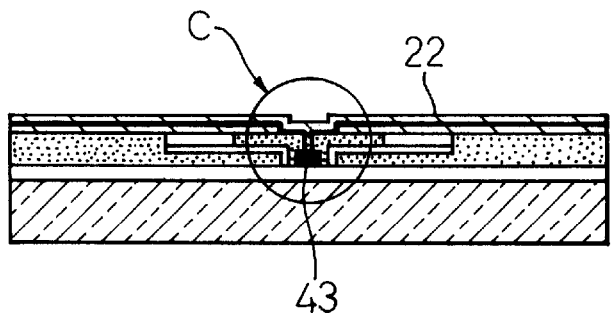
Figure 13:
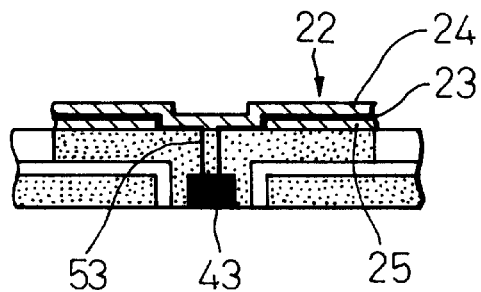

(6) A flexible conductor layer 22 shown in FIG. 6 is formed. As shown in FIGS. 12 and 13, a lower flexible insulating layer 25 made of polyimide or photoresist is formed into a bent pattern as shown in FIGS. 3 and 4. In this case, a connecting section of the movable conductor layer 22 with the conductor layer 53 of the head element 43 and a connecting section of the movable conductor layer 22 with the terminal 18 on the slider body side are opened by ion milling for the connection with a conductor 23. Next, the conductor 23 is formed on the lower flexible insulating layer 25. One end of the conductor 23 is electrically connected to the conductor layer 53 of the head element 43, and the other end is electrically connected to the terminal 18 on the slider body side. Next, an upper flexible insulating layer 24 made of polyimide or photoresist is formed on the conductor 23. In this way, a flexible conductor layer 22 is formed in which the conductor 23 is covered with the flexible insulating layers 24, 25 being sandwiched as shown in FIG. 12. In this connection, FIG. 13 is an enlarged view showing a portion C in FIG. 12.

Figure 14:
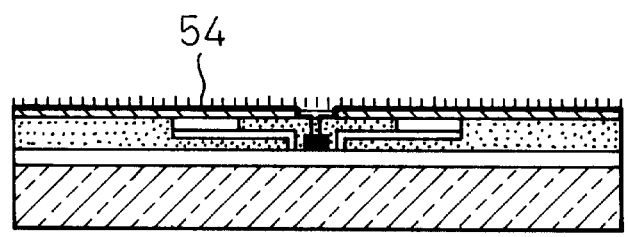

(7) A plated base (Ni) 54 is formed on the overall upper surface as shown in FIG. 14.

Figure 15:
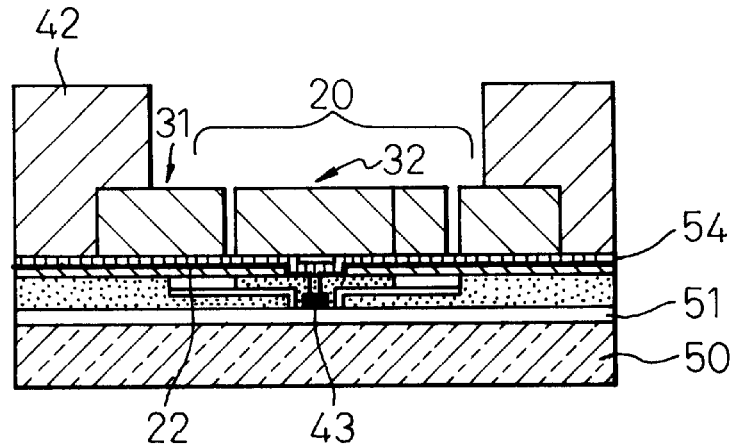

(8) Further, plating of Ni is conducted via the plated base (Ni) 54, so that the thickness of the movable section 32 provided with the head element 43 (Ni-plating) and the thickness of the stationary section 31 in the periphery can be a predetermined value. Further, the thickness of the head slider body 42 in the periphery is further increased. In this connection, the teeth 31a of the stationary section 31 and the teeth 32a of the movable section 32 of the electrostatic microactuator 20 shown in FIG. 4 are also formed in this process of plating of Ni as shown in FIG. 15.

Figure 16:
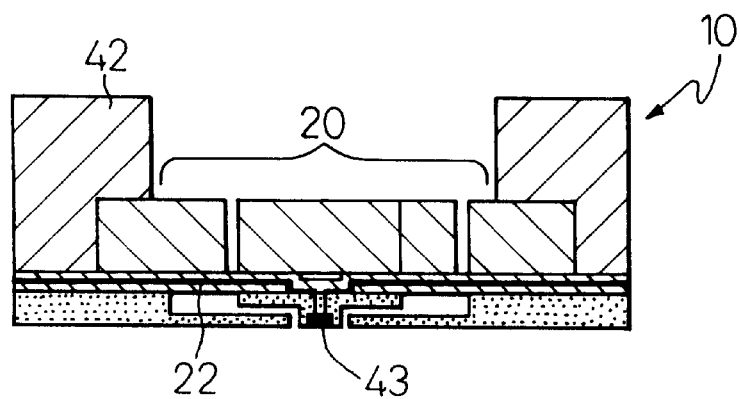

(9) When the sacrifice layers 51, 51a, 51b are removed by etching in, for example, a solution of KOH, the magnetic head slider 10 is separated from the substrate 50, and the magnetic head slider 10 (electrostatic microactuator 20) of the present invention is completed as shown in FIG. 16. By the action of the flexible insulating layer 24, the flexible lead wire 22 is supported in the air between the movable section 32 and the stationary section 31.

Next, the operation of the magnetic head slider of the present invention will be explained below. When the movable section 32 of the electrostatic actuator 20 is loaded and unloaded by the magnetic head slider 10, the head element 43 is made to come close to or contact a recording medium. On the other hand, when the electrostatic actuator 40a is driven into the tracking direction, the head element 43 can be positioned at a predetermined track position so as to record and reproduce information.

Figure 17:
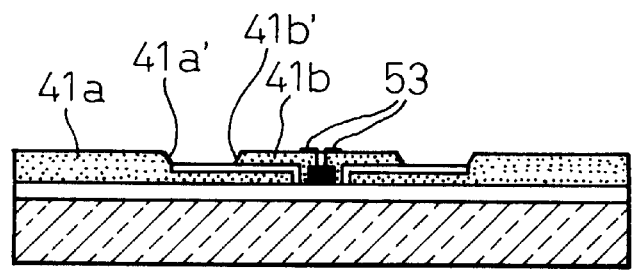
FIG. 17 is a view showing another example of the magnetic head slider of the present invention.
Figure 18:
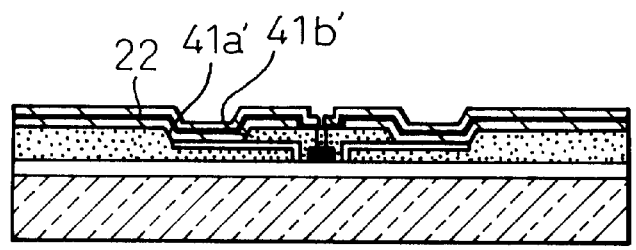
FIG. 18 is cross-sectional view showing the formation of a lead wire in the process successive to FIG. 17.

FIGS. 17 and 18 are views showing another embodiment of the formation process of the magnetic head slider 10 of the present invention, especially the formation process of the electrostatic microactuator 20. In the formation process of the above embodiment, the third sacrifice layer (Al) 51b is formed and the thickness of the sacrifice layer 51b is made to be the same as the thickness of the flying surface layers 41a, 41b in the process shown in FIG. 11. However, in this embodiment, instead of forming the third sacrifice layer (Al) 51b, in the formation process of forming the flying surface layers 41a, 41b in FIG. 9, a step portion between the movable section 32 and the stationary section 31 is formed tapered so that the tapered shapes 41a', 41b' can be formed as shown in FIG. 17. The flexible conductor layer 22 is formed along these tapered portions 41a', 41b' as shown in FIG. 18. The flexible conductor layer 22 itself is formed by the same method as that of the above embodiment. In this case, the flexible lead wires 22 are formed along the tapered portions 41a', 41b' on the flying surface layer 41a, 41b.

As explained above, according to the arrangement of the magnetic head slider of the present invention, the lead wires (flexible lead wires 22) such as signal wires drawn out from the head element provided in the movable section of the electrostatic microactuator can be formed in the wafer process in the formation of the magnetic head slider.

What is claimed is:

1. A magnetic head slider adapted to be opposed to a recording medium and comprising:

a medium opposing surface configured and arranged to be in contact with or fly above a recording medium;

a horizontal type head element having a head film which is parallel with said medium opposing surface;

a movable section constituted by a part of said head slider including said head element, said movable section supported on a stationary section including a slider body by means of a support spring so as to be movable within a small limited range in at least one of a tracking direction or a load-unload direction with respect to said recording medium; and a lead line extending from said head element, said head element being mounted on said movable section, said lead line being made of a flexible lead wire with at least one bent portion therein, said flexible lead wire extending from said movable section to said stationary section, said lead wire being of a lower rigidity than said support spring and being located at a position remote from said support spring, whereby said flexible lead wire does not obstruct movement of said movable section with respect to said stationary section.

2. A magnetic head slider as set forth in claim 1, wherein said flexible lead wire comprises, in cross-section thereof, a conductor portion and a flexible insulator covering said conductor portion.

3. A magnetic head slider as set forth in claim 2, wherein said flexible lead wire comprises three laminated layers including upper and lower flexible insulating layers and a central conductor layer sandwiched between said upper and lower flexible insulating layers.

4. A magnetic head slider as set forth in claim 3, wherein said flexible lead wire comprising upper and lower flexible insulating layers and a conductor layer sandwiched between said upper and lower flexible insulating layers is substantially parallel with said medium opposing surface.

5. A magnetic head slider as set forth in claim 3, wherein said flexible lead wire, comprising upper and lower flexible insulating layers and a conductor layer sandwiched between said upper and lower flexible insulating layers, has such a shape that it can be easily deformed within a single surface or outside of said single surface.

6. A magnetic head slider as set forth in claim 3, wherein said flexible lead wire, comprising upper and lower flexible insulating layers and a conductor layer sandwiched between said upper and lower flexible insulating layers, is bent at least twice to form a U-shaped portion in a small space between said movable section and said stationary section.

7. A magnetic head slider as set forth in claim 3, wherein said upper and lower flexible insulating layers comprise a cured photoresist.

8. A magnetic head slider as set forth in claim 1, wherein said horizontal type head element comprises an information recording head element and a reproducing head element.

9. A magnetic head slider as set forth in claim 1, including a plurality of said lead lines and one or more said support springs, so that a total rigidity of the lead lines is sufficiently smaller than a total rigidity of said one or more support springs.

10. A magnetic head slider adapted to be opposed to a recording medium and comprising:

a medium opposing surface configured and arranged to be in contact with or fly above a recording medium;

a horizontal type head element having a head film which is parallel with said medium opposing surface;

a movable section constituted by a part of said head slider including said head element, said movable section supported on a stationary section including a slider body by means of a support spring so as to be movable within a small limited range in at least one of a track direction or a load-unload direction with respect to said recording medium; and a lead line extending from said head element, said head element being mounted on said movable section, said lead line being made of a flexible lead wire with at least one bent portion therein, said flexible lead wire extending from said movable section to said stationary section and being located at a position remote from said support spring whereby said flexible lead wire does not obstruct movement of said movable section with respect to said stationary section.

* * * * *